United States Patent
Sato

(10) Patent No.: US 7,705,870 B2
(45) Date of Patent: Apr. 27, 2010

(54) LASER MARKING DEVICE, LASER MARKING METHOD, AND OBJECT TO BE MARKED

(75) Inventor: Kazuo Sato, Aizuwakamatu (JP)

(73) Assignee: Arai Corporation, Sizuwakamatsu-shi, Fukushima (JP)

( * ) Notice: Subject to any disclaimer, the term of this patent is extended or adjusted under 35 U.S.C. 154(b) by 36 days.

(21) Appl. No.: 10/578,249

(22) PCT Filed: Nov. 10, 2004

(86) PCT No.: PCT/JP2004/017035

§ 371 (c)(1),
(2), (4) Date: May 4, 2006

(87) PCT Pub. No.: WO2005/046926

PCT Pub. Date: May 26, 2005

(65) Prior Publication Data

US 2007/0086822 A1    Apr. 19, 2007

(30) Foreign Application Priority Data

Nov. 10, 2003  (JP) .............................. 2003-379777

(51) Int. Cl.
- *B41J 2/47* (2006.01)
- *B41J 2/435* (2006.01)
- *H05B 6/00* (2006.01)

(52) U.S. Cl. ................... 347/240; 347/251; 347/224; 264/482

(58) Field of Classification Search ............... 400/129; 347/224, 240, 251; 264/482
See application file for complete search history.

(56) References Cited

U.S. PATENT DOCUMENTS

| 4,683,371 A | | 7/1987 | Drexler |
| 4,822,973 A | | 4/1989 | Fahner et al. |
| 4,937,766 A | * | 6/1990 | Deppe et al. ................. 382/154 |
| 4,961,080 A | * | 10/1990 | Henderson et al. ........... 347/257 |
| 5,293,539 A | * | 3/1994 | Spence ........................ 358/527 |
| 5,389,196 A | * | 2/1995 | Bloomstein et al. ........... 216/66 |
| 5,575,936 A | | 11/1996 | Goldfarb |

(Continued)

FOREIGN PATENT DOCUMENTS

JP  03-124486  5/1991

(Continued)

*Primary Examiner*—Stephen D Meier
*Assistant Examiner*—Sarah Al-Hashimi
(74) *Attorney, Agent, or Firm*—Bacon & Thomas, PLLC

(57) ABSTRACT

A laser marking device that irradiates a laser beam on a workpiece (W) to transform a portion inside the workpiece at a focal point of the laser beam, thus putting a dot in each predetermined area. The laser marking device includes acquiring mechanism (10, 20) that acquires, as information on the dot, at least two-dimensional position information of an exposed section of the workpiece (W), and density information of the dot, coordinate setting mechanism (30) that calculates, for each dot according to the density information, dot depth information showing the distance from the surface of the workpiece (W) to the dot in the thickness direction of the workpiece (W), and sets three-dimensional coordinates for each dot based on a position specified by the dot depth information and the two-dimensional position information, and laser marking mechanism (40) that performs marking with the three-dimensional coordinates as a laser beam focal point.

10 Claims, 10 Drawing Sheets

U.S. PATENT DOCUMENTS

| | | | |
|---|---|---|---|
| 5,849,815 A * | 12/1998 | Aoki et al. | 523/161 |
| 6,037,968 A | 3/2000 | Emge et al. | |
| 6,087,617 A | 7/2000 | Troitski et al. | |
| 6,207,344 B1 * | 3/2001 | Ramlow et al. | 430/270.1 |
| 6,509,548 B1 * | 1/2003 | Troitski | 219/121.69 |
| 6,951,375 B2 * | 10/2005 | Patton et al. | 347/3 |
| 2002/0041323 A1 | 4/2002 | Hayashi et al. | |
| 2002/0046996 A1 * | 4/2002 | Reil et al. | 219/121.69 |
| 2003/0219577 A1 * | 11/2003 | Tait et al. | 428/212 |

FOREIGN PATENT DOCUMENTS

| | | |
|---|---|---|
| JP | 05-337659 | 12/1993 |
| JP | 07-076167 | 3/1995 |
| JP | 2001-276985 | 10/2001 |
| JP | 2003-088966 | 3/2003 |
| WO | WO 03/072069 | 9/2003 |

* cited by examiner

LASER MARKING DEVICE, LASER MARKING METHOD, AND OBJECT TO BE MARKED

TECHNICAL FIELD

The present invention relates to a laser marking device, a laser marking method, and an object to be marked, and more particularly relates to a laser marking device, a laser marking method, and an object to be marked which can adjust the density of an image and the like to be marked, and can perform marking which causes marked two-dimensional codes, characters, logo marks, images, and the like to appear clearly and three-dimensionally hovering.

BACKGROUND ART

There has been known a conventional technology which uses a marking device to mark two-dimensional codes, characters, logo marks, images, and the like on a transparent polycarbonate material.

The polycarbonate is a transparent material in a pure state, and is generally excellent in shock resistance, weather resistance, electrical insulation, dimensional stability, and the like.

A conventional method to mark characters and the like on the polycarbonate often employs inkjet printing.

However, the conventional printing by means of the inkjet directly attach ink to a surface of the transparent polycarbonate, and there pose such problems that the applied ink is separated by a contact, is subject to a secular change, and is inferior in durability.

In order to solve these problems, there has been developed a technology which performs marking by means of a laser beam on the polycarbonate material (refer to Japanese Laid-Open Patent Publication (Kokai) No. H5-337659, line 7 of second column to line 10 of third column, for example: Document 1).

The patent document 1 describes laser marking on the polycarbonate material in the following way.

Namely, there is described a method and a marking device, which perform marking by irradiating a repetitively pulsed YAG laser beam on a workpiece made of a polycarbonate material, thereby transforming the color of a component material at the irradiated position to black.

However, according to the conventional laser marking method for the polycarbonate, even if the marked portion has changed the color thereof to brown to black, marked images, characters, and the like have high light transmittance, and thus have a defect of inferior visibility, and there poses such a problem that the sole polycarbonate can hardly be applied to products such as cards.

Moreover, since the visibility of the marked images and characters is low, it is difficult to mark an image such as a photograph which requires a fine adjustment of density changes on the polycarbonate.

It is an object of the present invention to solve the above problems by providing a laser marking device and a laser marking method which, upon marking an image or the like read by a scanner or the like on the polycarbonate, mark the image which bares comparison with the original image by adjusting the dot depth and the dot diameter.

Moreover, it is another object of the present invention to provide a laser marking device and a laser marking method which build up a polycarbonate material and a resin material, and perform marking such that two-dimensional codes, characters, logo marks, images, and the like appear clearly and hovering three-dimensionally.

DISCLOSURE OF THE INVENTION

According to the present invention, there is provided a laser marking device which irradiates a laser beam on a workpiece to transform a portion inside the workpiece at a focal point of the laser beam, thus putting a dot in each predetermined area, characterized by including acquiring means which acquires, as information on the dot, at least two-dimensional position information of an exposed section of the workpiece, and density information of the dot, coordinate setting means which calculates, for each dot according to the density information, dot depth information showing the distance from the surface of the workpiece to the dot in the thickness direction of the workpiece, and sets three-dimensional coordinates for each dot based on a position specified by the dot depth information and the two-dimensional position information acquired by the acquiring means, and laser marking means which performs marking with the three-dimensional coordinates as a laser beam focal point.

With this configuration, it is possible to adjust the depth of the mark to be marked by changing the focal point of the laser beam irradiated on the workpiece.

Each marked mark appears different in the density depending on the difference in the depth.

Thus, by adjusting the depth of the each mark, it is possible to adjust the density of an image configured as a collection of marks.

According to the present invention, there is provided a laser marking device which irradiates a laser beam on a workpiece to transform a portion inside the workpiece at a focal point of the laser beam, thus putting a dot in each predetermined area, characterized by including acquiring means which acquires, as information on the dot, at least two-dimensional position information of an exposed section of the workpiece, and density information of the dot, marking information setting means which calculates, for each dot according to the density information, dot depth information showing the distance from the surface of the workpiece to the dot in the thickness direction of the workpiece and dot diameter information showing the diameter of the dot, sets three-dimensional coordinates for each dot based on a position specified by the dot depth information and the two-dimensional position information acquired by the acquiring means, and sets the dot diameter information for each dot in the three-dimensional coordinates, thereby forming marking information for each dot, and laser marking means which performs marking by controlling a marking condition according to the marking information set by the marking information setting means.

With this configuration, it is possible to change the density of an image configured as a collection of dots by adjusting the diameter of each dot, resulting in adjustment of the density as in the grayscale print, which is a general print technology.

Moreover, since it is possible to change the dot depth at the same time, it is possible to perform density adjustment finer than the density adjustment by changing the diameter of dots.

As a result, even if a photographic image or the like read by a scanner is marked, it is possible to obtain a marked image which bears comparison with the original photograph.

On this occasion, there is preferably provided such a configuration that the laser marking is performed for at least one dot in the area.

With this configuration, it is possible to form an image as a collection of multiple dots on a workpiece by the laser marking. Moreover, since an image is formed as a combination of multiple dots different in the dot depth and the dot diameter on a workpiece, it is possible to express an image having a change in the density.

Moreover, on this occasion, there is preferably provided such a configuration that the workpiece is made of a light transmitting resin material, and includes a core material, which is a colored material having light reflectivity, on the rear surface of the workpiece.

With this configuration, even if the marking is performed in a workpiece such as polycarbonate with high light transmittance, the visibility of a marked image increases due to the contrast to the core material.

Moreover, there is an optical path difference between a reflected light beam on the surface of the marked image and a reflected light beam on the surface of the core material, and the marked image is thus visually recognized as three-dimensionally hovering above the core material.

Further, there is preferably provided such a configuration that the workpiece is made of a light transmitting resin material, and includes a core material, which is a colored material having light reflectivity, on the rear surface of the workpiece, and another workpiece is in contact with a surface opposite to the contact surface between the core material and the workpiece.

With this configuration, it is possible to perform marking respectively for the two workpieces built up on both the front and rear sides of the core material, and it is thus possible to mark images with high visibility and sense of three dimensions on both the front and rear sides.

Moreover, on this occasion, there is preferably provided such a configuration that the core material is configured by building up two types of resin materials.

With this configuration, it is possible to use two types of core materials. For example, if two types of core materials are used, it is possible to use different background colors for the front and rear surfaces.

Further, according to the present invention, there is provided an object to be marked including a workpiece formed by a light transmitting resin material, and a core material which is a colored material having light reflectivity, and is built up on a rear surface of the workpiece, characterized in that marking is carried out such that multiple dots different in the distance from the surface of the workpiece in the thickness direction are formed in the workpiece, and the difference in the depth among the multiple dots causes the dots appear different in the density.

On the object to be marked formed in this way is marked an image including a density change according to the difference among the respective dot depths. As a result, it is possible to obtain an object to be marked on which clear and three-dimensionally recognized images are marked.

Moreover, according to the present invention, there is provided an object to be marked including a workpiece formed by a light transmitting resin material, and a core material which is a colored material having light reflectivity, and is built up on a rear surface of the workpiece, characterized in that marking is carried out such that multiple dots different respectively in the distance from the surface of the workpiece in the thickness direction and the diameter are formed in the workpiece, and the differences in the depth and the diameter of each dot cause the each unit area in which the dots are formed appears different in the density.

Images having density changes which bear comparison with original images read by a scanner or the like are marked on the object to be marked formed in this way by adjusting the diameter and the depth of the dots. Thus, it is possible to obtain an object to be marked on which are marked images which express density changes more finely than the general grayscale print in which the density of an image is adjusted by changing the dot density by means of the change of the dot diameter.

Further, according to the present invention, there is provided a laser marking method which irradiates a laser beam on a workpiece to transform a portion inside the workpiece at a focal point of the laser beam, thus putting a dot in each predetermined area, characterized by including an information acquiring step of acquiring, as information on the dot, at least two-dimensional position information of an exposed section of the workpiece, and density information of the dot, a dot information acquiring step of calculating and acquiring, for each dot according to the density information acquired by the information acquiring step, dot depth information showing the distance from the surface of the workpiece to the dot in the thickness direction of the workpiece, and dot diameter information showing the diameter of the dot, a three-dimensional coordinate setting step of setting three-dimensional coordinates for each dot based on a position specified by the two-dimensional position information acquired by the information acquiring step and the dot depth information acquired by the dot information acquiring step, a marking information setting step of setting the dot diameter information acquired by the dot information acquiring step for each dot in the three-dimensional coordinates set by the three-dimensional coordinate setting step, thereby forming marking information, and a laser marking step of adjusting a laser beam irradiating condition based on the marking information formed by the marking information setting step and then irradiating the laser beam on the workpiece.

With this configuration, it is possible to recognize the density of an image such as a photograph read by a scanner or the like, and to calculate a dot diameter and a dot depth according to the density. Then, it is possible to assign the three-dimensional coordinates and dot diameter information to each dot according to the two-dimensional position information acquired and the calculated data of the dot diameter and dot depth.

Since the laser marking can be performed according to the information formed in this way, it is possible to easily and clearly mark an image, which bears comparison with an image such as an original photograph, on a workpiece.

Other advantages and the like of the present invention will appear more fully from the following description.

BEST MODE FOR CARRYING OUT THE INVENTION

A description will now be given of an embodiment of the present invention with reference to drawings. It should be noted that members, arrangements, configurations, and the like described later are not intended to limit the present invention, and will be modified in various ways within a purport of the present invention.

Figure 1:
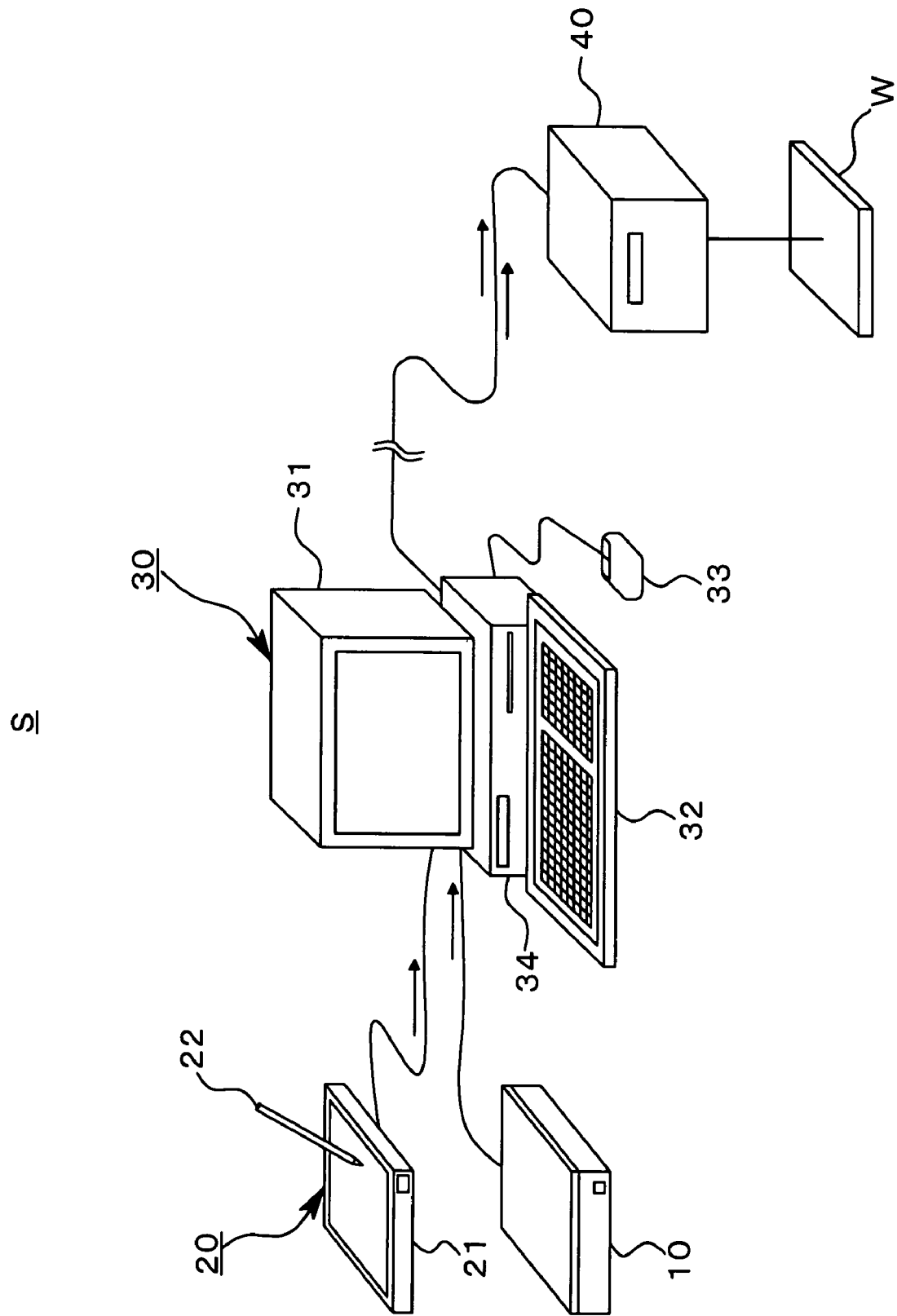
FIG. 1 is a view describing an overall configuration of a laser marking device according to an embodiment of the present invention.
Figure 2:
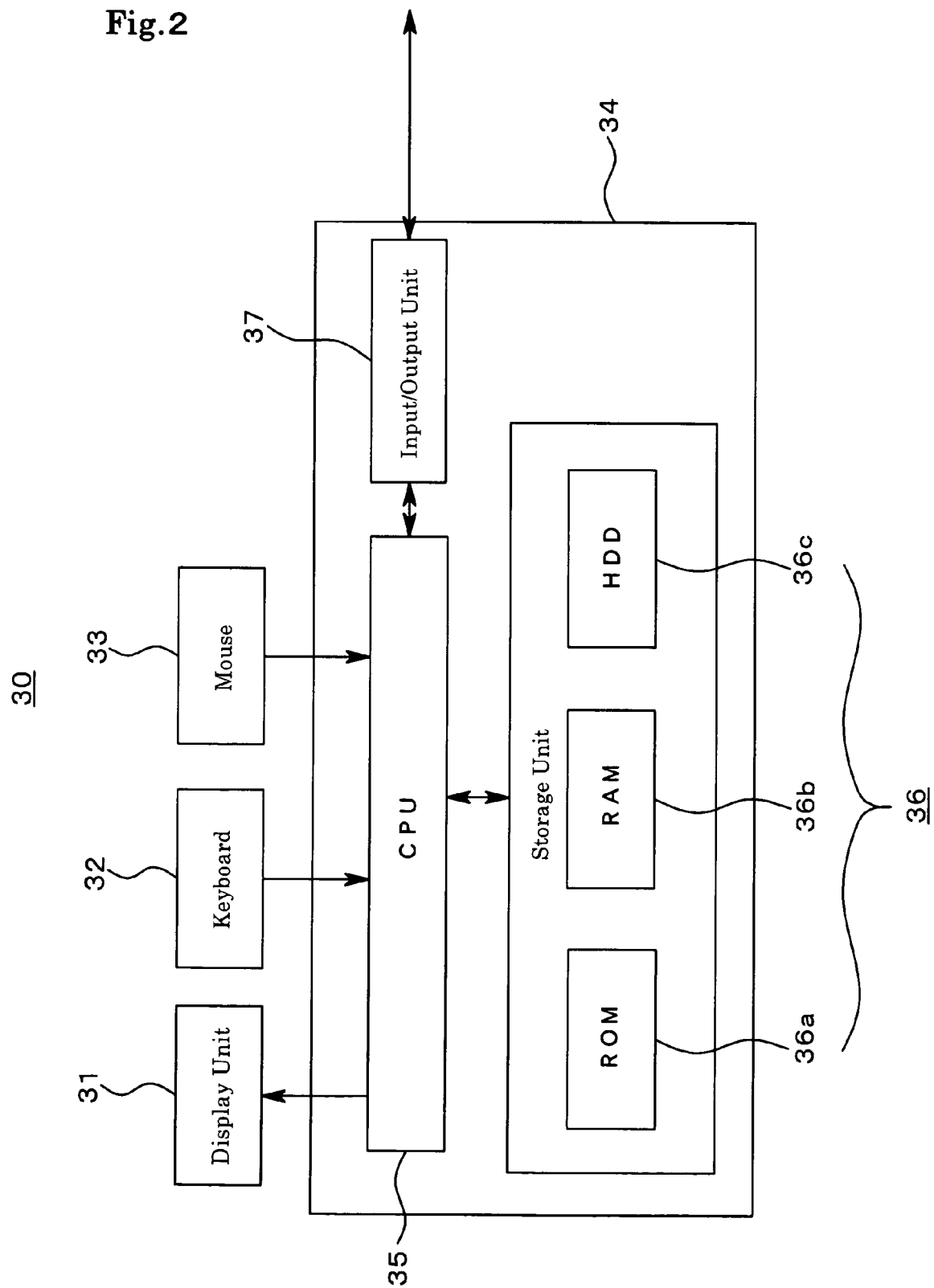
FIG. 2 is a diagram describing a configuration of a data control unit according to the embodiment of the present invention.
Figure 3:
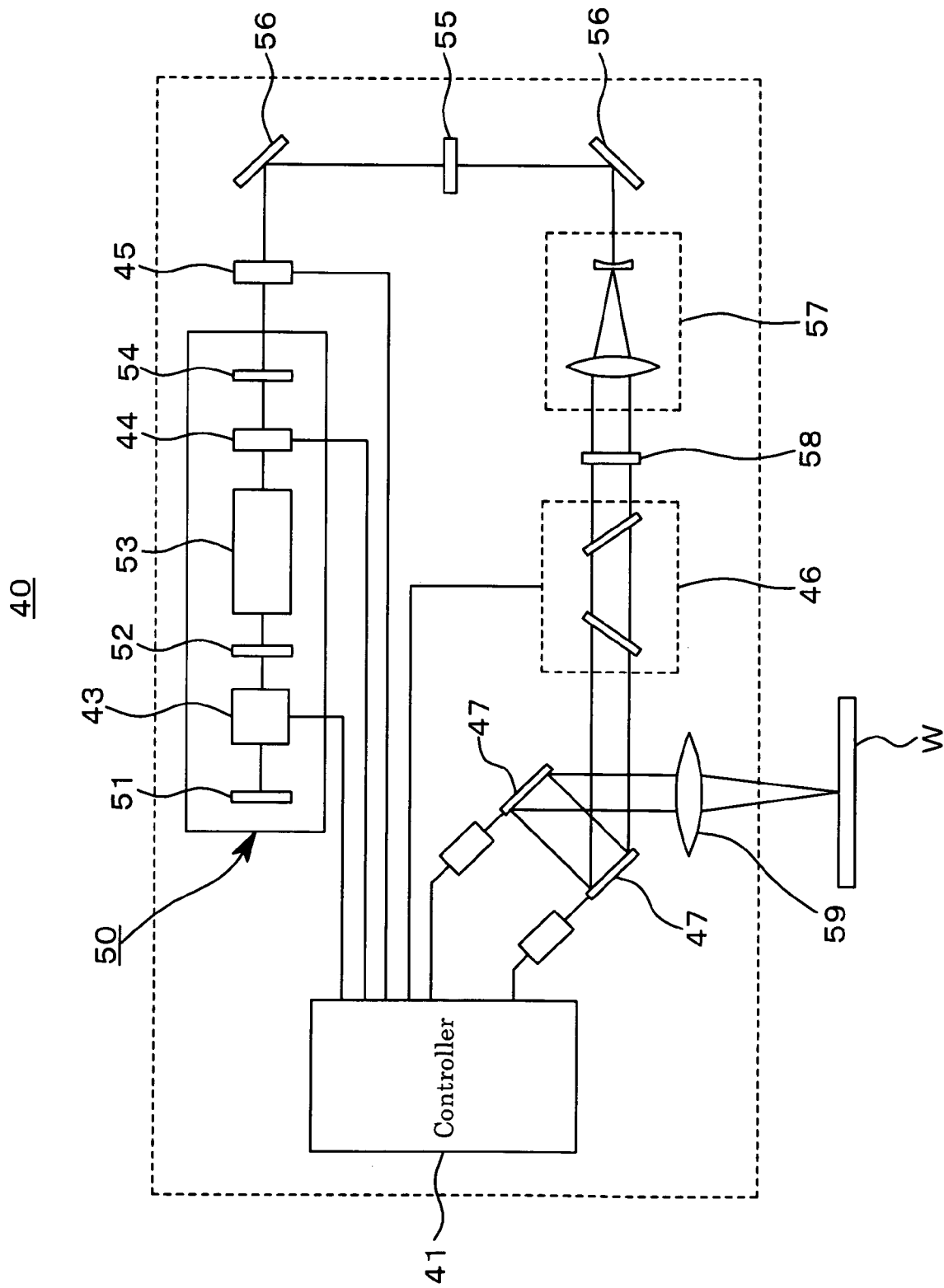
FIG. 3 is a diagram describing a configuration of a laser marker according to the embodiment of the present invention.
Figure 4:
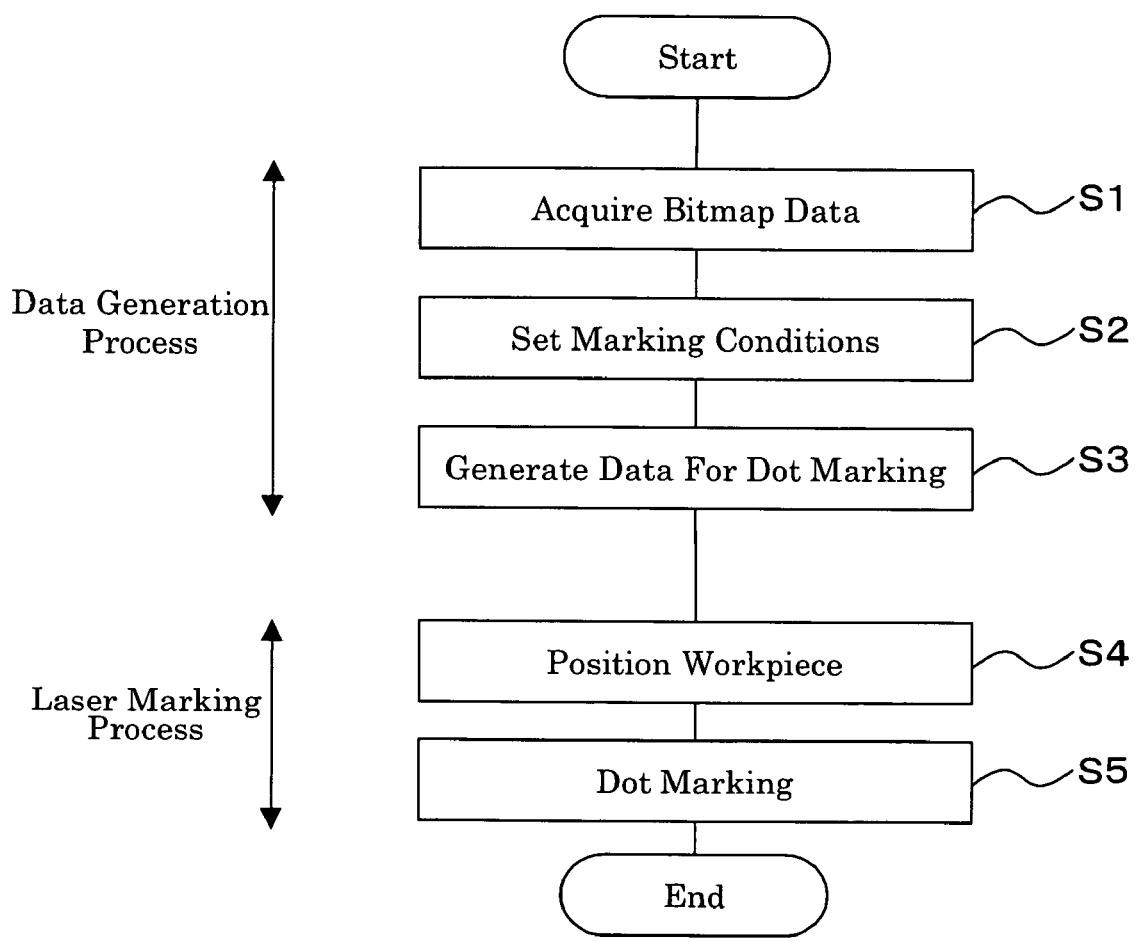
FIG. 4 is a flowchart showing a flow of a process of a laser marking method according to the embodiment of the present invention.
Figure 5:
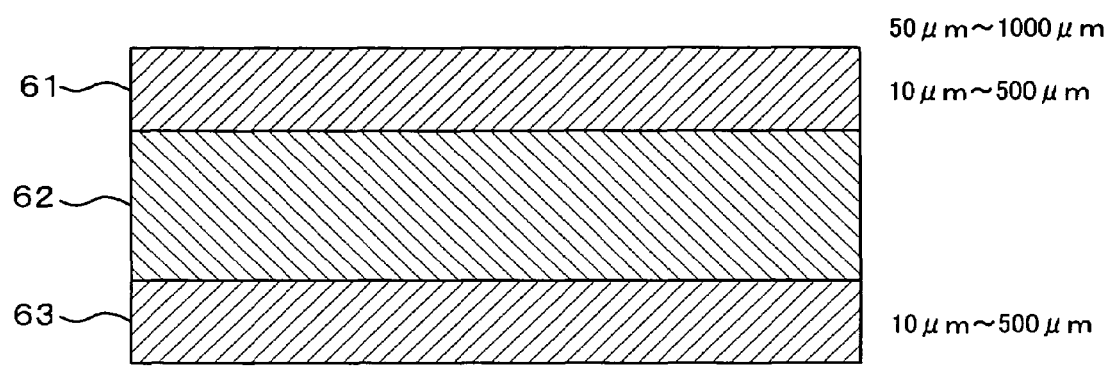
FIG. 5 is a cross sectional view of a card having a three-layer structure according to the embodiment of the present invention.
Figure 6:
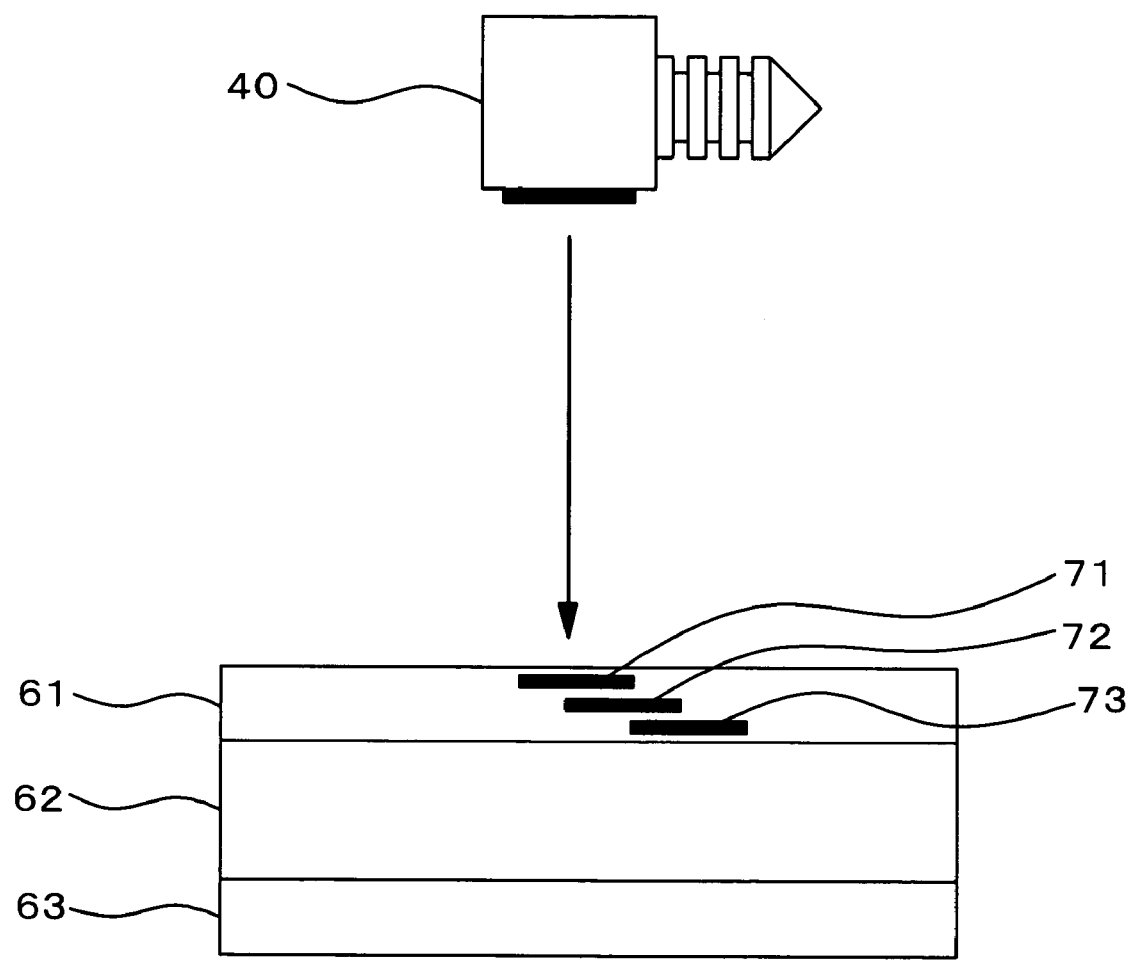
FIG. 6 is a view describing a marking depth upon inside marking being performed for the card having the three-layer structure according to the embodiment of the present invention.
Figure 7:
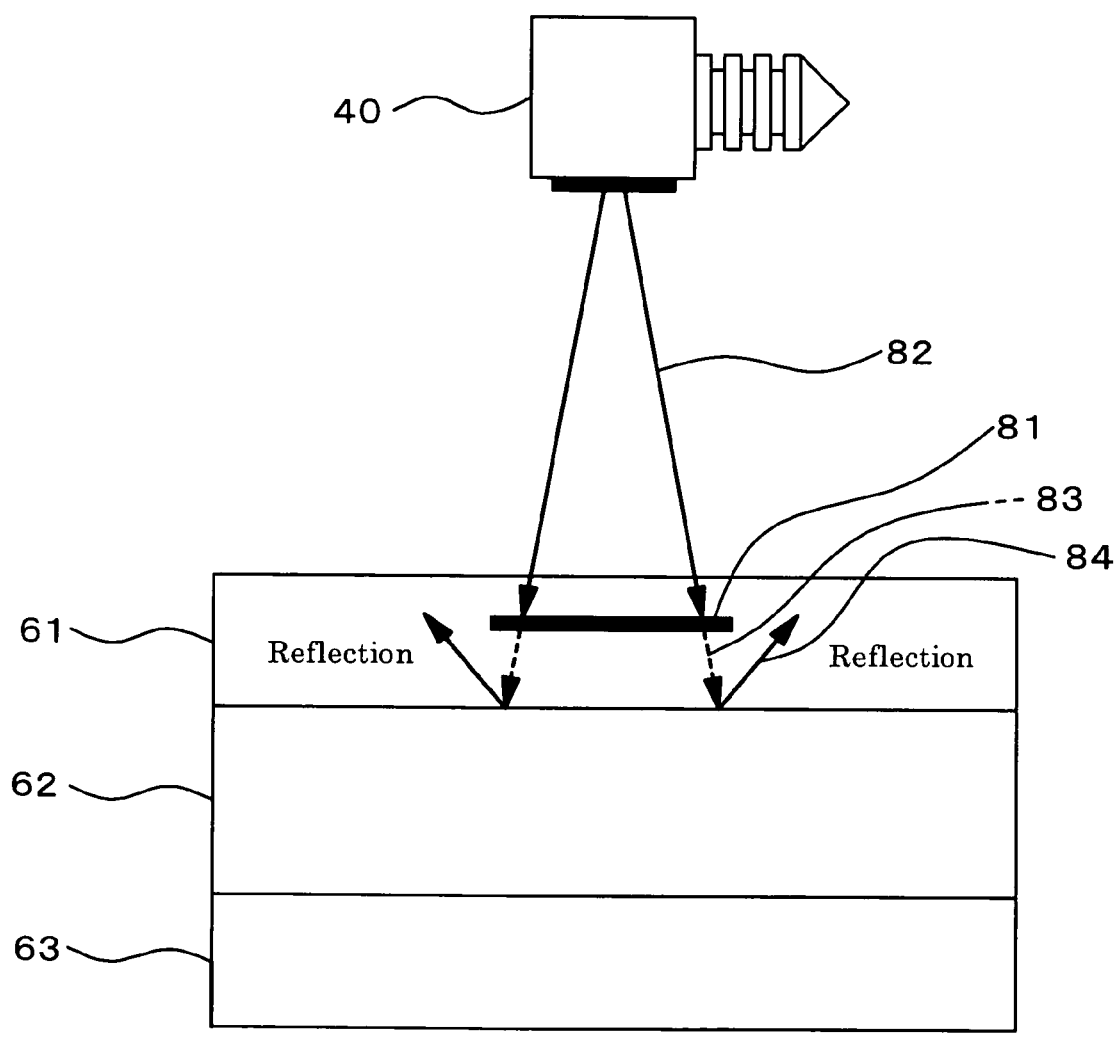
FIG. 7 is a view describing trajectories of a laser beam which have passed a marking portion according to the embodiment of the present invention.
Figure 8:
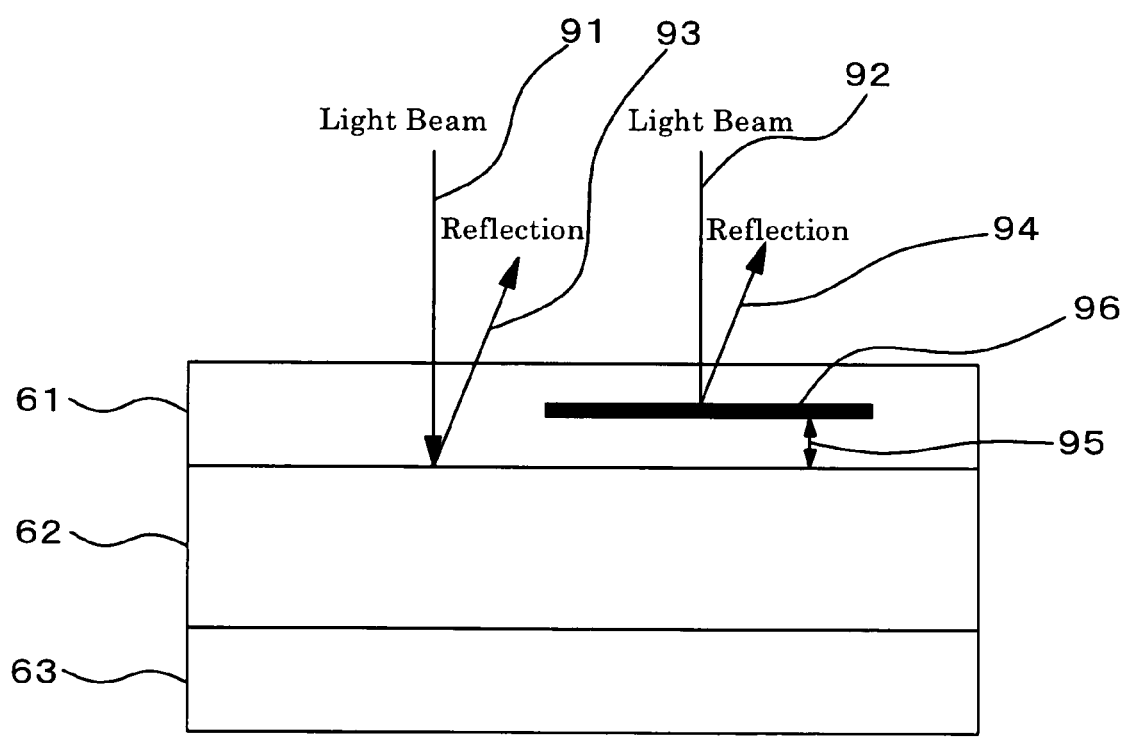
FIG. 8 is a view describing a state where a marking portion is three-dimensionally recognized according to the embodiment of the present invention.
Figure 9:
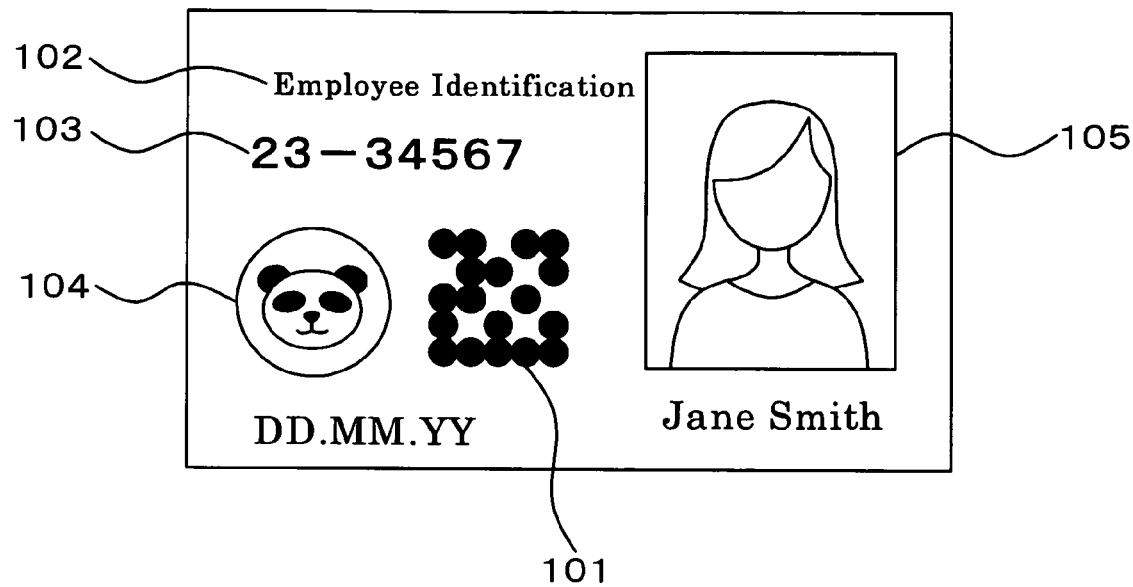
FIG. 9 is a view showing a card created by the laser marking method according to an embodiment of the present invention.
Figure 10:
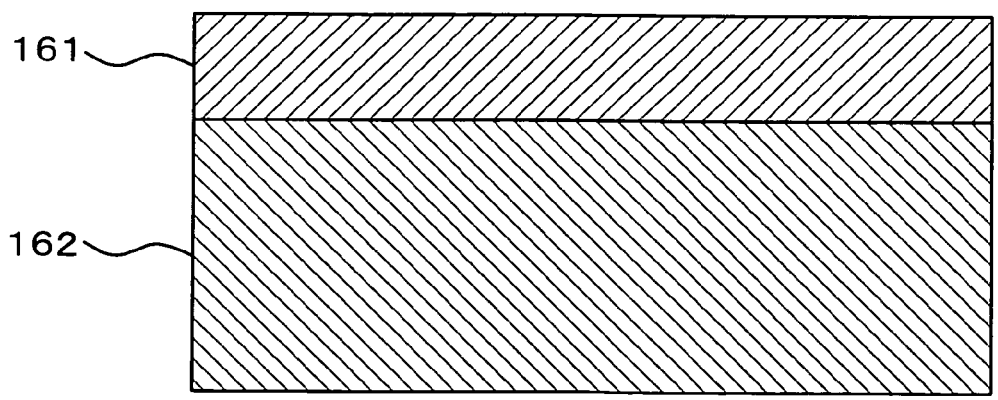
FIG. 10 is a cross sectional view of a card having a two-layer structure according to another embodiment of the present invention.
Figure 11:
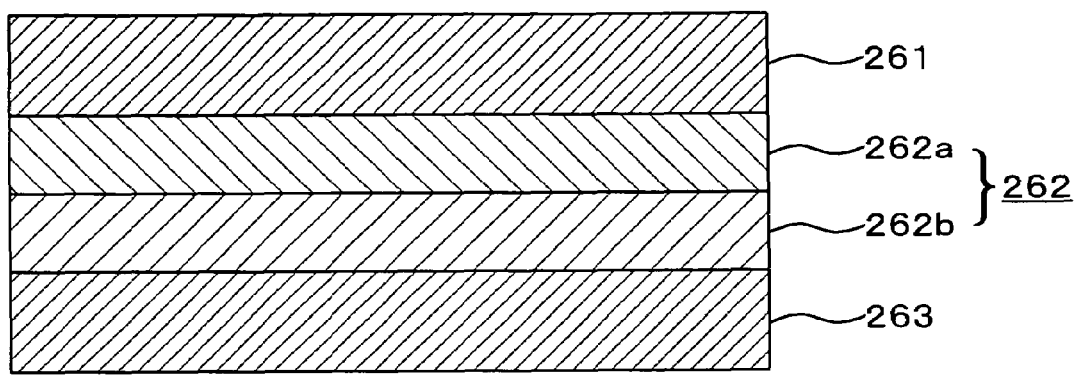
FIG. 11 is a cross sectional view of a card having a four-layer structure according to still another embodiment of the present invention.

FIGS. 1 to 11 are views showing embodiments of the present invention in which: FIG. 1 is a view describing an overall configuration of a laser marking device, FIG. 2 is a diagram describing a configuration of a data control unit, FIG. 3 is a diagram describing a configuration of a laser marker, FIG. 4 is a flowchart showing a process of a laser marking method according to the present embodiment, FIG. 5 is a cross sectional view of a card having a three-layer structure, FIG. 6 is a view describing a marking depth upon inside marking performed for the card having the three-layer structure, FIG. 7 is a view describing trajectories of a laser beam which have transmitted through a marking portion, FIG. 8 is a view describing a state where a marking portion is three-dimensionally recognized, FIG. 9 is a view showing a card created by the laser marking method according to the present embodiment, FIG. 10 is a cross sectional view of a card having a two-layer structure, and FIG. 11 is a cross sectional view of a card having a four-layer structure.

FIG. 1 describes the overall configuration of the laser marking device according to the embodiment of the present invention.

Reference numeral S shown in FIG. 1 denotes the laser marking device according to the present embodiment.

The laser marking device S is preferably used to mark marking patterns such as characters, graphics, symbols, and images on a workpiece, and includes a scanner 10, a tablet 20, a data control unit 30, and a laser marker 40 as major components.

The scanner 10 serves as input means for marking patterns.

The scanner 10 reads analog data relating to the marking patterns such as characters, graphics, and symbols written on a sheet and the like, and images captured as photographs by means of an internal sensor, converts the read analog information into digital information, and outputs the digital information.

The tablet 20 also serves as input means for marking patterns as the scanner 10.

The tablet 20 is configured to input analog information by using a pen 22 to draw marking patterns such as characters, graphics, and symbols on a planar input unit 21. The input analog information is converted into digital information, and the digital information is then output.

It should be noted that the marking pattern input means according to the present invention may be constituted by a CCD camera, a digital camera, a video camera, a mobile terminal, and the like as well as the scanner 10 and the tablet 20, or may be constituted by a keyboard 32 and a mouse 33 provided for the data control unit 30 described later.

Further, there may be provided a configuration where marking patterns are input to the input means remotely via a communication network.

The data control unit 30 serving as control means generates marking patterns on an object to be marked W based on the digital data output from the scanner 10 and the tablet 20, and causes the laser marker 40 described later to operate according to the generated marking data.

The data control unit 30 according to the present embodiment is constituted by a personal computer, and the configuration thereof includes a display unit 31, a keyboard 32, a mouse 33, and a personal computer main unit 34.

The personal computer main unit 34 includes a CPU 35 which serves as an arithmetic processing/control processing device for data, and a storage unit 36 which stores various data as shown in FIG. 2, and the storage unit 36 is constituted by a ROM 36a, a RAM 36b, and a hard disk 36c, which are storage devices, and an input/output unit 37.

The ROM 36a stores a control program which causes the CPU 35 to operate, and the RAM 36b which is used as a work area to temporarily store data.

The hard disk 36c stores font data (general font data such as those of "Mincho" and "Gothic") created in advance, marking pattern data relating to characters, graphics, and symbols, and the like.

Moreover, the hard disk 36c stores parameter information. The parameter information is set as conditions to perform the laser marking.

The conditions include a laser frequency, a laser output, the number of times of prints, a beam diameter, a period of the irradiation. These conditions are read by the CPU 35 upon the laser marking.

The input/output unit 37 carries out inputs/outputs of information between the data control unit 30 and external devices. A result of the arithmetic processing by the CPU 35 is transmitted to the laser marker 40 via the input/output unit 37.

Though the data control unit 30 and the laser marker 40 are directly connected with each other via a cable according to the present embodiment, they may be connected with each other via an information communication network such as a wireless LAN and the Internet.

With this configuration, it is possible to transmit an instruction and data from another location or a remote location to control the laser marker 40. For example, there may be such possible configurations that the data control unit 30 is installed in a control room or the like, and the laser marker 40 is installed in a work room, and that the data control unit 30 is installed at head quarters, and the laser markers 40 are installed at respective local factories.

The laser marker 40 is conventional one known publicly, and includes the YAG laser, the $CO_2$ laser, the $YVO_4$ laser, the UV laser, the green laser, and the like.

Though there is shown such a configuration that the data control unit 30 and the laser marker 40 are installed as one to one configuration according to the present embodiment, there may be provided such a configuration that multiple laser markers 40 are connected to the data control unit 30, and a laser marker 40 which emits a proper laser beam is selected according to an object to be marked.

As an example of the laser marker 40, FIG. 3 shows a configuration of a YAG laser device used for the present embodiment.

In the laser marker 40, for a laser beam emitted from a YAG laser oscillator 50, an optical path thereof is changed by a leveling mirror 56, the beam diameter thereof is narrowed by an aperture 55, and then the beam diameter thereof is expanded by a Galileo type beam expander 57.

Further, after the beam diameter thereof is adjusted by an aperture 58, the laser beam is attenuated by an attenuator 46, the optical path thereof is changed and adjusted by a galvanometer mirror 47, the laser beam is condensed by an fθ lens 59, and is irradiated on the object to be marked W.

The YAG laser oscillator 50 is provided with an ultrasonic Q-switch element 43 in order to obtain a pulse laser beam whose peak output (peak value) is extremely high.

The YAG laser oscillator 50 is further provided with a whole-surface reflecting mirror 51, an internal aperture 52, a lamp house 53, an internal shutter 44, and an output mirror 54, and an external shutter 45 is provided on an output side of the YAG laser oscillator 50.

The Q switch element 43, the internal shutter 44, the external shutter 45, the attenuator 46, and the galvanometer mirror 47 perform the above control based on data transmitted from the data control unit 30.

With reference to FIGS. 4 to 11, a description will now be given of a method to use the laser marking device S configured as described above to mark marking patterns set and input by a user on an object to be marked W.

FIG. 4 shows a flow of a process of the laser marking method.

First, in a data generation process, there is obtained bitmap data for a marking pattern to be marked on the object to be marked W (step S1).

Namely, when the user inputs analog data on the scanner 10 or the tablet 20, the analog data is read into the scanner 10 or the tablet 20, and is converted into digital data, and the digital data is output to the control unit 30. The output digital data is stored in a bitmap file format in the data control unit 30.

Bitmap data may be obtained by drawing characters and graphics on a bitmap file by means of the mouse 33.

Moreover, the font data and characters stored in the hard disk 36c may be read out by using the keyboard 32 to input characters, thereby acquiring bitmap data from the font data and character data.

On this occasion, commercially available font data (such as "Kanjouryu", "Sumo characters", and "brush characters") may be installed in the data control unit 30, and bitmap data may be obtained from this font data.

Moreover, it is apparent that original font created by direct handwriting by the user may be read by the scanner 10 or the tablet 20 to acquire bitmap data.

Then, marking conditions are set (step S2).

On this occasion, when characters, two-dimensional codes, logo marks, and the like are marked, as "laser parameters" are set the wavelength of a laser beam to be irradiated, the beam diameter, the frequency of the Q switch element, an electric power value, the power, the dot irradiation time, the number of times of marking, and the like. Moreover, when characters are input, as "character parameters" are set a font size, a position, a character spacing, bold setting, italic setting, and the like.

It should be noted that when an image which is read by the scanner 10, and includes density information is to be marked, marking conditions corresponding to the laser parameters are automatically calculated and determined by the data control unit 30.

In this case, the laser wavelength is selected from 1064 nm, 532 nm, 354 nm, and 166 nm, and the laser frequency and the laser output are respectively adjusted within 1 to 200 kHz and 1 to 100%.

Then, there is generated marking data used to perform dot marking of characters, two-dimensional codes, images, and the like from the bitmap data stored in the data control unit 30 as well as based on the conditions set in the step S2 (step S3).

Namely, there is detected presence/absence of a pattern input for each pixel in a bitmap file. On this occasion, the detection of the presence/absence of the pattern input is performed from the upper right side to the upper left side of the bitmap file, the detection proceeds to a next row below upon arrival at the upper left side, the detection further moves down one row below upon arrival at the right end. In this way the detection is alternately performed from right to left, then downward, and then left to right.

Moreover, the density of the marking pattern is recognized as a grayscale, and the dot diameter and the dot depth are calculated and set for each pixel according to the density.

The dot diameter is the diameter of a dot.

The dot depth corresponds to the focal point of the laser beam, and is a value which defines the position of the focal point of the laser beam as a distance in the thickness direction from the surface of the object to be marked W.

On this occasion, there is performed detection to determine whether each pixel is black or white, and if the pixel is black, it is determined that there has been a pattern input, and there are detected the dot diameter of a dot to be marked at the each pixel, and the dot depth of the dot to be marked at the each pixel. If the pixel is white, it is determined that there has not been a pattern input.

Then, two-dimensional coordinate data of the marking pattern is acquired based on the pixels to which the pattern input has been performed, three-dimensional coordinate data is acquired from the two-dimensional coordinate data thus acquired and the calculated dot depth, and the dot marking data used to perform the dot marking is formed based on the three-dimensional coordinate data, the dot diameter, and the respective conditions (the conditions automatically calculated for the image data including the density information acquired from the scanner 10) set in the step 2 for the dot to be marked for each pixel.

Then, the process proceeds from the data generation process to a laser marking process.

First, it is determined at which position on the object to be marked W the characters, graphics, images, and the like are marked, and the object to be marked W is positioned in a marking area in the laser marking process (step S4).

The laser marker 40 is then used to irradiate the laser beam on the object to be marked W, and to form the marking pattern including an array of the dots for the object to be marked W (step 5).

Namely, the dot marking data formed by the data control unit 30 is transmitted to the controller 41 of the laser marker 40.

The dot marking data is then received by the controller 41.

The controller 41 controls the ultrasonic Q switch element 43, the internal shutter 44, the external shutter 45, the attenuator (optical attenuator) 46, and the galvanometer mirror 47 based on the dot marking data.

Consequently, the laser beam is irradiated on the object to be marked W, and the dot marking is performed according to the dot marking data.

The marked characters, graphics, images, and the like are a collection of multiple dots.

FIG. 5 shows a cross sectional view of the object to be marked W used in the present embodiment.

As shown in FIG. 5, the object to be marked W according to the present embodiment is configured as a three-layer structure including a polycarbonate top layer 61, a core material 62, and a polycarbonate bottom layer 63.

The polycarbonate top layer 61 and the polycarbonate bottom layer 62 correspond to workpieces.

The polycarbonate top layer 61 and the polycarbonate bottom layer 63 have a layer thickness of 10 μm to 500 μm, and are stacked on a top surface and a bottom surface of the core material 62 while sandwiching the core material 62 having a layer thickness of 50 μm to 1000 μm.

It should be noted that the polycarbonate top layer 61 and the polycarbonate bottom layer 63 are not limited to the shape of a rectangular solid which has a constant layer thickness, and may have a shape having an uneven layer thickness, or may have a curved surface such as a spherical surface.

The polycarbonate is also referred to as polycarbonate ester, and is a linear macromolecule including carbonate ester bonds in a main chain thereof. The polycarbonate is a material excellent in dimensional stability, transparency, and shock resistance, and is a stable material used also as engineering plastic and the like.

Though the polycarbonate is used as the material of the top layer 61 and the bottom layer 63 according to the present embodiment, the material of the top layer 61 and the bottom layer 63 is not limited to the polycarbonate. For example, the material may be a transparent or semitransparent translucent material such as polystyrene, acrylic, polyethylene, and polypropylene.

As the core material 62 is used a colored resin having high reflectance.

The markings formed in the polycarbonate top layer 61 and the polycarbonate bottom layer 63 are brown to black, and the resin used as the core material 62 thus does not preferably has a color of brown to black close to the color of the markings.

The resin used as the core material 62 preferably has a color having high lightness such as a primary color or a color of white which can be clearly distinguished from the markings.

The core material 62 is not limited to a resin, may be a membrane such as a film adhered to the surface of the polycarbonate top layer 61 or the polycarbonate bottom layer 63 opposite to the surface on which the laser beam is irradiated, or may be a colored coating or the like applied on the polycarbonate top layer 61 or the polycarbonate bottom layer 63.

The polycarbonate top layer 61 and the polycarbonate bottom layer 63 are marked by the laser beam irradiated by the laser marker. FIG. 6 shows how the marking is performed in the polycarbonate top layer 61 by the laser beam.

According to the present embodiment, inside marking is performed inside the polycarbonate top layer 61 and the polycarbonate bottom layer 63. The inside marking is a method to perform marking by irradiating a laser beam focused inside an object to be marked, and transforming the irradiated portion inside the object to be marked at the focal point of the laser beam. With this method, it is possible to perform marking without destructing the surface of the object to be marked.

In this way, the marking applied by means of the inside marking is clearly recognized in contrast to the core material 62.

As FIG. 6 shows, with the laser marking device S according to the present invention, it is possible to adjust the depth of a portion to be marked, namely the focal point of the laser beam.

FIG. 6 shows a state where a top surface side marking 71, a middle side marking 72, and a bottom surface side marking 73 are performed in the polycarbonate top layer 61.

In this way, it is possible to slightly change the visually recognized density of a dot to be marked by changing the depth of the marking position.

Namely, if the middle side marking 72 is considered as a reference, the top surface side marking 71 which is arranged closer to the top surface is viewed darker than the middle side marking 72. Similarly, the bottom surface side marking 73 which is arranged closer to the bottom surface is viewed lighter than the middle side marking 72.

In this way, according to the example shown in FIG. 6, the density of the markings increases in the order of the bottom surface side marking 73, the middle side marking 72, and the top surface side marking 71.

Though three points are compared for the sake of explanation in FIG. 6, it is possible to finely control the focal point of the laser beam, and it is thus possible to finely adjust the marking density by finely adjusting the depth of a marking position.

FIG. 7 shows trajectories of the laser beam which has passed the marking portion.

The laser beam 82 emitted by the laser marker 40 performs marking at the focal point, and forms a marking 81, and a part of the laser beam transmits through the marking 81 due to the transmittance and the reactivity of the polycarbonate top layer 61 and proceeds downward. The transmitted light beam 83 is fully reflected on a top surface of the core material 62. Thus, the transmitted light beam 83 does not perform a marking below the marking position, and the marking is performed only at the specified position.

FIG. 8 shows a state where the marking portion is three-dimensionally and clearly recognized.

An incident light beam 91, upon reaching the core material 62, is reflected as a reflected light beam 93 on the surface of the core material 62.

An incident light beam 92 incident simultaneously with the incident light beam 91, upon reaching a marking portion 96, is reflected as a reflected light beam 94 on a top surface of the marking portion 96.

The reflected light beam 94 reflected on the top surface of the marking portion 96 and the reflected light beam 93 reflected on the surface of the core material 62 are visually recognized, there are an optical path difference 95 between the marking portion 96 and the core material 62, and there is thus generated a difference between respective time points at which the reflected light beam 94 and the reflected light beam 93 are visually recognized. As a result, the marking portion 96 is clearly recognized as a state of hovering three-dimensionally above the core material 62.

FIG. 9 shows an example of a card 100 produced according to the present embodiment.

The card 100 is made of a white synthetic resin as the core material 62, and includes transparent polycarbonate top layer 61 and the polycarbonate bottom layer 63.

Moreover, a laminate treatment is applied after the marking to protect the surfaces of the card.

The laminate treatment is a treatment to adhere laminate film on the front and rear surfaces of a card or the like to increase the storage stability, and, as the laminate film, there are used a film made from ethylene copolymer such as olefin resin.

On the card 100 are marked a two-dimensional code 101, characters 102, numbers 103, a logo mark 104, and a photographic image 105.

According to the present embodiment, the method of the above-described dot marking is employed to form black cells constituting the two-dimensional code 101, the characters 102, the numbers 103, the logo mark 104, and the photographic image 105.

The two-dimensional code 101 is a code which represents a bright/dark pattern by means of a combination of white and black cells arranged as a matrix to show data.

According to the dot marking method of the present embodiment, for a unit cell to be represented as a black cell, circular dots are formed by means of the laser marking in an n×n or n×m (n and m are integers) arrangement. Circular dots are arranged in the cell by intermittently irradiating the laser beam while the irradiating position of the laser beam is controlled.

Moreover, according to the dot marking method of the present embodiment, it is possible to control the size of the unit cell. Namely, when the code size is specified as a parameter, the control unit 30 calculates the size of the unit cell, and the marking is then performed according to the size of the unit cell.

As a result, even if the quantity of information stored in the two-dimensional code increases, it is not necessary to increase the code size, and the increase of the information quantity is addressed by reducing the unit cell size.

As a result, even if the information quantity stored in the two-dimensional code changes, the area occupied by the two-dimensional code remains unchanged on the object to be marked, and it is possible to put a two-dimensional code including a sufficient quantity of information even if there is produced a product having a restriction on the area such as an employee identification card and a name plate.

Moreover, as described above, it is possible to use commercially available fonts (such as Kanjouryu, Sumo characters, and brush characters), all fonts specified by the user on a personal computer running an OS such as Windows (registered trade mark), signs originally produced by the user, original fonts, and the like as the characters 102 and the numbers 103 in addition to the fonts stored in the memory.

Analog data of these fonts is input as digital data to the data control unit 30, and is stored in the data control unit 30 in the bitmap file format as described above.

As the logo mark 104, an image may be input by the scanner 10, or an image created by the personal computer 34 may be input. The logo mark 104 is stored in the data control unit 30 in the bitmap file format as the characters 102 and the numbers 103.

The photographic image 105 is created based on a photographic image input from the scanner 10.

The photographic image is stored in the data control unit 30 in the bitmap file format as the characters 102 and the numbers 103 are.

The marking of the photographic image 105 is controlled in the following manner to provide image identification capability as a photograph.

The photographic image is represented as a collection of dots different in the diameter and the depth.

According to the conventional print technology, a gray-scale is expressed by adjusting the density of halftone points. Namely, a portion with a high density of the halftone points presents a dark color, and a portion with a low density of the halftone points presents a light color.

According to the present invention, dots produced by the laser marking are used as halftone points, and it is possible to express a finer gray scale by changing the dot diameter and the dot depth as well as simply changing the density.

Namely, a color becomes darker when the dot diameter of dots increases, and the color becomes lighter when the dot diameter of dots decreases in the same area.

Moreover, as described with reference to FIG. 6, a color becomes slightly darker when the depth of a dot to be marked is caused to be shallower, and a color becomes slightly lighter when the depth of the dot to be marked is caused to be deeper.

Thus, even if dots with the same diameter are arranged at the same density, for example, it is possible to express slightly darker/lighter colors by changing the dot depth.

It is possible to express an image which bears comparison with a color image by changing the diameter and depth of dots to be marked.

As a result, verifiability of a photographic image increases, and it is thus possible to apply the laser marking method according to the present invention to products such as an employee identification and various types of identifications, which require high image verifiability.

FIG. 10 is a view showing another embodiment, and the object to be marked W has a two-layer structure.

The object to be marked W with the two-layer structure is configured such that a polycarbonate top layer 161 is built up on a top surface of a core material 162, and there is no carbonate layer on a bottom surface of the core material 162.

Thus, when the object to be marked W has a two-layer structure, marking is performed only in the polycarbonate top layer 161.

The other items such as the laser marking methods and the like are the same as those of the above-described three-layer structure.

If the quantity of the information used for the laser marking is small, the cost of the materials can be advantageously restrained by using the object to be marked W with the two-layer structure.

FIG. 11 is a view showing still another embodiment, and the object to be marked W has a four-layer structure.

When the object to be marked W has the four-layer structure, there are used two types of core materials 262: a first core material 262a and a second core material 262b. On a top surface of the second core material 262b is built up the first core material 262a.

On a top surface side of the first core material 262a is built up a polycarbonate top layer 261, and on a top surface of a polycarbonate bottom layer 263 is built up the second core material 262b.

As a result, there are sequentially built up the polycarbonate bottom layer 63, the second core material 262b, the first core material 262a, and the polycarbonate top layer 261 from the bottom layer side.

For the object to be marked W with the four-layer structure, it is possible to perform the laser marking on the both surfaces: the polycarbonate top layer 261 and the polycarbonate bottom layer 263.

In this case, resins used as the first core material 262a and the second core material 262b are the same as the resin used for the above-described core material 62. On this occasion, if resins different in color are respectively used for the first core material 262a and the second core material 262b, it is possible to manufacture an object to be marked W which are formed by front and rear surfaces different in colors.

For example, it is possible to produce a nameplate or the like where a white resin is used for the first core material, and a resin different in color according to company sections is used for the second core material.

In this case, when a name, a section, a photographic image, and the like are marked on the front side (the side of the white resin), and a two-dimensional code including color information is marked on the rear side (the side of the colored resin), it is possible to doubly check the security by means of the color information and the two-dimensional code.

As described above, according to the present invention, the polycarbonate materials 61 and 63 and the core material 62 are built up, the inside marking is performed in the polycarbonate materials 61 and 63, and the markings applied to the polycarbonate materials 61 and 63 can thus be clearly recognized with contrast to the core material 62.

Moreover, the markings applied to the polycarbonate materials 61 and 63 are viewed three-dimensionally hovering above the core material 62.

Moreover, since it is possible to adjust the depth of a marking for the inside marking, it is possible to slightly adjust the density of the visually recognized color of the marking, and it is further possible to express a fine and clear image by means of the laser marking in combination with the adjustment of the dot diameter and the dot density.

Moreover, since the inside marking does not generate recesses and protrusions on the surface of the polycarbonate materials 61 and 63, it is possible to manufacture products excellent in the durability. Further, the laminate treatment enables to manufacture products more excellent in the durability.

INDUSTRIAL APPLICABILITY

As described above, according to the present invention, since an object to be marked is constituted by building up a core material made from a resin on the rear surface of a workpiece, the visibility of dots marked on the workpiece increases.

Namely, since a colored material which has high reflectivity is used for the core material, the core material reflects the incident light beam, the marked dots are recognized as hovering, and the dots are clearly recognized in contrast between the color of the core material and the color of the dots.

Moreover, since there is generated an optical path difference between the reflected light beam from the marked dots and the reflected light beam from the surface of the core material, the marked dots are three-dimensionally recognized.

Further, according to the present invention, when the dot marking is performed in the workpiece, since it is possible to change the dot diameter and the dot depth for each dot, it is possible to reproduce a clear and three-dimensional image on the workpiece.

When image data such as a photograph including density information is read for the marking, it is necessary to reflect the density information to the marking.

Thus, if the dot diameter is changed according to the density information upon the marking, it is possible to express high and low of the density by means of the dot density as in the ordinary grayscale print.

Moreover, according to the present invention, it is possible to adjust the position of a mark formed inside a workpiece by controlling the focal point of the laser beam irradiated upon the inside marking.

Namely, if the mark depth is defined as a distance in the thickness direction of a workpiece from the surface of the workpiece to a dot position (namely the focal point of the laser beam), it is possible to finely adjust the density by changing the mark depth.

It is thus possible to express a slight density gradation which cannot be expressed only by the simple change of the dot diameter.

For example, when there is marked an image having complex density information such as photographic image, it is possible to obtain a clearer marking image, the verifiability thus increases even for an complex image such as a human face, and it is possible to apply the marking method according to the present invention to a product which requires security such as an employee identification.

Further, according to the present invention, it is possible to calculate the dot diameter data and the dot depth data for each dot from the density information of read image data, and to automatically set the marking conditions such as the laser wavelength and the laser irradiation period from the dot diameter data and the dot depth data, resulting in an increase of the convenience.

The invention claimed is:

1. A laser marking device that irradiates a laser beam on a workpiece to transform a portion inside the workpiece at a focal point of the laser beam, thus putting a dot in each predetermined area, characterized by comprising:
   acquiring means that acquires, as information on the dot, at least two-dimensional position information of an exposed section of the workpiece, and density (lightness/darkness) information of the dot;
   coordinate setting means that calculates, for each dot according to the density information, dot depth information showing the distance from the surface of the workpiece to the dot in the thickness direction of the workpiece, and sets three-dimensional coordinates for each dot based on a position specified by the dot depth information and the two-dimensional position information acquired by said acquiring means; and
   laser marking means that performs marking with the three-dimensional coordinates as a laser beam focal point to transform a portion inside the workpiece.

2. The laser marking device according to claim 1, characterized in that the laser marking is performed for at least one dot in the area.

3. The laser marking device according to claim 1, characterized in that the workpiece is made of a light transmitting resin material, and comprises a core material, which is a colored material having light reflectivity, on the rear surface of the workpiece.

4. The laser marking device according to claim 1, characterized in that the workpiece is made of a light transmitting resin material, and comprises a core material, which is a colored material having light reflectivity, on the rear surface of the workpiece, and another workpiece is in contact with a surface opposite to the contact surface between the core material and the workpiece.

5. The laser marking device according to claim 4, characterized in that the core material is configured by building up two types of resin materials.

6. A laser marking device that irradiates a laser beam on a workpiece to transform a portion inside the workpiece at a focal point of the laser beam, thus putting a dot in each predetermined area, characterized by comprising:
   acquiring means that acquires, as information on the dot, at least two-dimensional position information of an exposed section of the workpiece, and density (lightness/darkness) information of the dot;
   marking information setting means that calculates, for each dot according to the density information, dot depth information showing the distance from the surface of the workpiece to the dot in the thickness direction of the workpiece, and dot diameter information showing the diameter of the dot, sets three-dimensional coordinates for each dot based on a position specified by the dot depth information and the two-dimensional position information acquired by said acquiring means, and sets the dot diameter information for each dot in the three-dimensional coordinates, thereby forming marking information for each dot; and laser marking means that performs marking by controlling a marking condition according to the marking information set by said marking information setting means.

7. The laser marking device according to claim 6, characterized in that the laser marking is performed for at least one dot in the area.

8. The laser marking device according to claim 6, characterized in that the workpiece is made of a light transmitting resin material, and comprises a core material, which is a colored material having light reflectivity, on the rear surface of the workpiece.

9. The laser marking device according to claim 6, characterized in that the workpiece is made of a light transmitting resin material, and comprises a core material, which is a colored material having light reflectivity, on the rear surface of the workpiece, and another workpiece is in contact with a surface opposite to the contact surface between the core material and the workpiece.

10. A laser marking method that irradiates a laser beam on a workpiece to transform a portion inside the workpiece at a focal point of the laser beam, thus putting a dot in each predetermined area, characterized by comprising:

an information acquiring step of acquiring, as information on the dot, at least two-dimensional position information of an exposed section of the workpiece, and density (lightness/darkness) information of the dot;

a dot information acquiring step of calculating and acquiring, for each dot, according to the density information acquired by said information acquiring step, dot depth information showing the distance from the surface of the workpiece to the dot in the thickness direction of the workpiece, and dot diameter information showing the diameter of the dot;

a three-dimensional coordinate setting step of setting three-dimensional coordinates for each dot based on a position specified by the two-dimensional position information acquired by said information acquiring step and the dot depth information acquired by said dot information acquiring step;

a marking information setting step of setting the dot diameter information acquired by said dot information acquiring step for each dot in the three-dimensional coordinates set by said three-dimensional coordinate setting step, thereby forming marking information; and a laser marking step of adjusting a laser beam irradiating condition based on the marking information formed by said marking information setting step and then irradiating the laser beam on the workpiece.

* * * * *

UNITED STATES PATENT AND TRADEMARK OFFICE
CERTIFICATE OF CORRECTION

PATENT NO. : 7,705,870 B2  
APPLICATION NO. : 10/578249  
DATED : April 27, 2010  
INVENTOR(S) : Kazuo Sato Page 1 of 1

It is certified that error appears in the above-identified patent and that said Letters Patent is hereby corrected as shown below:

Please replace the existing information with the following:

(73) Assignee Arai Corporation, Aizuwakamatsu-shi, Fukushima (JP)

Signed and Sealed this  
Twenty-sixth Day of July, 2011

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,705,870 B2 | Page 1 of 1 |
| APPLICATION NO. | : 10/578249 | |
| DATED | : April 27, 2010 | |
| INVENTOR(S) | : Kazuo Sato | |

It is certified that error appears in the above-identified patent and that said Letters Patent is hereby corrected as shown below:

Title Page, Item (73) Assignee,

Please replace the existing information with the following:

-- Arai Corporation, Aizuwakamatsu-shi, Fukushima (JP) --

This certificate supersedes the Certificate of Correction issued July 26, 2011.

Signed and Sealed this
Twenty-third Day of August, 2011

David J. Kappos
*Director of the United States Patent and Trademark Office*